(12) United States Patent
Mayer

(10) Patent No.: US 9,528,496 B2
(45) Date of Patent: Dec. 27, 2016

(54) FAST RUN-BACK CONTROL INCLUDING PLANT LOSSES

(71) Applicant: VESTAS WIND SYSTEMS A/S, Aarhus N (DK)

(72) Inventor: Peter Frederick Mayer, Singapore (SG)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 94 days.

(21) Appl. No.: 14/345,686

(22) PCT Filed: Sep. 29, 2012

(86) PCT No.: PCT/DK2012/050367
§ 371 (c)(1),
(2) Date: Mar. 19, 2014

(87) PCT Pub. No.: WO2013/044927
PCT Pub. Date: Apr. 4, 2013

(65) Prior Publication Data
US 2015/0300318 A1      Oct. 22, 2015

Related U.S. Application Data

(60) Provisional application No. 61/541,137, filed on Sep. 30, 2011.

(30) Foreign Application Priority Data

Dec. 29, 2011   (DK) .................................. 2011 70763

(51) Int. Cl.
*F03D 7/02*       (2006.01)
*F03D 7/04*       (2006.01)
(Continued)

(52) U.S. Cl.
CPC ............ *F03D 7/0288* (2013.01); *F03D 7/0264* (2013.01); *F03D 7/0272* (2013.01); *F03D 7/0284* (2013.01);
(Continued)

(58) Field of Classification Search
CPC ............................. F03D 7/0288; F03D 7/0264
(Continued)

(56) References Cited

U.S. PATENT DOCUMENTS 4,511,807 A  *  4/1985  Somerville ...................... 290/44
7,068,015 B1 *  6/2006  Feddersen ............. F03D 7/0272
                                                        290/44

(Continued)

FOREIGN PATENT DOCUMENTS

EP          2017936  A1      1/2009

OTHER PUBLICATIONS

International Search Report for PCT/DK2012/050367, Feb. 13, 2013.
Danish Search Report for PA 2011 70763, Jun. 27, 2012.

*Primary Examiner* — Tulsidas C Patel
*Assistant Examiner* — Sean Gugger
(74) *Attorney, Agent, or Firm* — Patterson + Sheridan, LLP

(57) ABSTRACT

The present invention relates to a method for operating a wind power plant, with at least one wind turbine generator and a power plant controller, the method includes the steps of receiving a request to reduce active power output from the wind power plant, dispatching a reference set point to the at least one wind turbine generator to lower a voltage level of the least one wind turbine generator, and the at least one wind turbine generator controls the voltage level of the least (Continued)

one wind turbine generator, to a new lower set point. The present invention also relates to a wind power plant where the method is implemented.

21 Claims, 4 Drawing Sheets

(51) Int. Cl.
   *F03D 9/00* (2016.01)
   *H02H 7/06* (2006.01)
(52) U.S. Cl.
   CPC ............... *F03D 7/048* (2013.01); *F03D 9/003* (2013.01); *F03D 9/005* (2013.01); *H02H 7/067* (2013.01); *F05B 2270/337* (2013.01); *Y02E 10/723* (2013.01)
(58) Field of Classification Search
   USPC ..................................................... 290/44, 55
   See application file for complete search history.

(56) References Cited

U.S. PATENT DOCUMENTS

| | | | | |
|---|---|---|---|---|
| 8,301,313 | B2* | 10/2012 | Wobben | 700/297 |
| 8,378,643 | B2* | 2/2013 | Arinaga et al. | 322/29 |
| 2007/0090651 | A1* | 4/2007 | Wobben | 290/44 |
| 2009/0254223 | A1 | 10/2009 | Helle et al. | |
| 2010/0142237 | A1* | 6/2010 | Yuan | H02J 3/386 363/97 |
| 2010/0274401 | A1* | 10/2010 | Kjaer et al. | 700/287 |
| 2010/0276930 | A1 | 11/2010 | Fortmann | |
| 2010/0286835 | A1* | 11/2010 | Nyborg et al. | 700/287 |
| 2011/0043186 | A1* | 2/2011 | Bech et al. | 323/364 |
| 2011/0089693 | A1* | 4/2011 | Nasiri | F03D 7/0272 290/44 |
| 2011/0153099 | A1* | 6/2011 | Garcia | 700/287 |
| 2011/0156391 | A1* | 6/2011 | Kirchner | F03D 7/0284 290/44 |
| 2013/0168963 | A1* | 7/2013 | Garcia | 290/44 |

\* cited by examiner

FAST RUN-BACK CONTROL INCLUDING PLANT LOSSES

FIELD OF THE INVENTION

The present invention relates generally to a wind power plant, and in particular, to a method for operating a fast reduction in power production from a wind power plant.

BACKGROUND OF THE INVENTION

A wind turbine is an energy conversion system which converts kinetic wind energy into electrical energy for utility power grids. Specifically, wind incident on blades of the wind turbine generator causes a rotor of the wind turbine generator to rotate. The mechanical energy of the rotating rotor in turn is converted into electrical energy by an electrical generator. Because wind speed fluctuates, the force applied to the WTG blades and hence the rotational speed of the rotor/generator can vary. Power grids however require a constant frequency electrical power to be generated by the wind turbine generator.

A wind power plant is often referred to as a group of wind turbine generators which are commonly connected to an electrical grid through a common connection point, also known as Point of Common Coupling (PCC). Additionally the wind power plant may comprise a power plant controller and/or some sort of reactive power compensation equipment, such as STATCOMs or switch capacitors, or others.

One or more wind turbines of the wind power plant may be requested to shut down, for example due to a fault in the grid, component failure in the wind turbine generator, wind farm or requested by the grid operator. The wind turbine generator reduces its power during shut down, the power produced by the wind turbine decreases to zero at a specified rate. The rate of decrease of power, commonly called the power ramp down rate, is dependent on the power ramp down rate of the generator. How fast the turbine power can decrease during a shut down is normally limited by the maximum ramp down rate of the generator e.g. 0.2 pu/sec.

However, certain grid codes/utilities may require the turbine to ramp down at a rate faster than the maximum ramp down rate of the turbine/generator e.g. 0.4 pu/sec. It is also foreseen that some countries may specify in their grid code requirements a minimum ramp down rate of turbines during shut down.

Some transmission grids may require a rapid decrease in output power from Wind Power Plants (WPP); often such rapid decrease is called a "fast run-back". This may be triggered by over-frequency excursions or other grid events.

Rapid power reduction may be archived in different ways, various types of turbine may, due to mechanical loads be restricted in its freedom to perform rapid power reductions, performed by fully shutting down the turbine or by blade pitching.

Hence it is desirable to provide a method of operating a wind turbine to provide a power ramp down which causes limited mechanical loads on the wind turbine generator and its components.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present invention provides a novel solution to the above mentioned problem, namely how to reduce active power output from a wind power plant without causing mechanical loads on the wind turbine generators.

In an aspect, the present invention relates to operating a wind power plant, with at least one wind turbine generator and a power plant controller, the method comprises the steps of:

receiving a request to reduce active power output from the wind power plant, dispatching a reference set point to the at least one wind turbine generator to lower a voltage level of the least one wind turbine generator, the at least one wind turbine generator controls said voltage level of the least one wind turbine generator, to a new lower set point, the new lower set point of said voltage level causing an increase of active power losses in the wind power plant to thereby reduce active power output from the wind power plant.

An advantage of first aspect is mainly that the losses in the cables and other substation equipment will increase. This will very quickly decrease the output of the wind power plant without adding any mechanical stress to the wind turbine generators. Secondly, if the fast run-back is triggered by an over-frequency situation, pulling down the voltage on the grid will benefit the whole electrical grid system.

A further advantage of first aspect is that the controller is easy to implement. It takes advantage of basic physics and existing hardware to decrease mechanical loads on wind turbine generators and make the wind power plant according to the present invention more grid-friendly.

According to one embodiment of the invention the request to reduce power is due to a run back event. Such a run back event may be reception of a request to rapidly decrease the output power from Wind Power Plants (WPP). An advantage of this embodiment is that the present invention provides a fast way to reduce active power supplied to an electrical grid, and run back events require fast active power reductions.

According to one embodiment of the invention the dispatched reference set point is a set point of reactive power, $Q_{ref}$.

An advantage of this embodiment is that the present invention is intended also to be implemented in already built wind power plants, where the reference set point dispatched in order to control the voltage level at the point of common coupling already is a reactive power reference.

According to one embodiment of the invention the reference set point is a set point of the voltage level of the at least one wind turbine generator.

An advantage of this embodiment is similar to that described in relation to the previous embodiment, but in relation to wind power plants that may operate with a dispatched voltage reference set point to each wind turbine generator.

According to one embodiment of the invention the reference set point is calculated based on an impedance at a connection point of the at least one wind turbine generator.

An advantage of this embodiment is that the present invention is that taking the impedance into account gives a better effect of the active power losses, but also it ensures that the voltage level at each wind turbine generator does not get below a minimum level, which will get the turbine to trip.

According to one embodiment of the invention the impedance is calculated based on electrical parameter values for the components in the wind power plant.

An advantage of this embodiment is that the present invention knowing the electrical parameters of the components in the grid makes it easy to calculate the impedance and thus a correct set point is dispatched without tripping the turbines.

According to one embodiment of the invention the impedance is measured during operation of the wind power plant.

An advantage of this embodiment is that the present invention is that the setpoints of reactive power, $Q_{ref}$, and/or the setpoint of the voltage level, $V_{ref}$, can be calculated in many different ways. A feed-back loop which decreased the voltage (or reactive power) as long as the Power error is negative is one option. Knowing the construction on the WPP in advance a look-up table could be built to provide the right increase in reactive power Q or voltage V for each individual wind turbine generator to meet the exact power change. This could also be calculated in real time if the WPP cable data is input into a computer program. Another possibility is the use of a learning algorithm that determines the best references based on past observations.

In a second aspect, the present invention relates to a power plant controller for controlling a wind Power Plant with at least one wind turbine generator, wherein the power plant controller is arranged for dispatching a reference signal to the at least one wind turbine generator upon a request to reduce active power from the wind power plant, said reference signal is arranged to provide a decrease in the voltage level of the least one wind turbine generator, and wherein the decreased voltage level causes an increase of active power losses in the wind power plant to thereby reduce active power output from the wind power plant.

The advantages of the second aspect and its embodiments are equivalent to the advantages for the first aspect of the present invention.

Any of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

Figure 1:
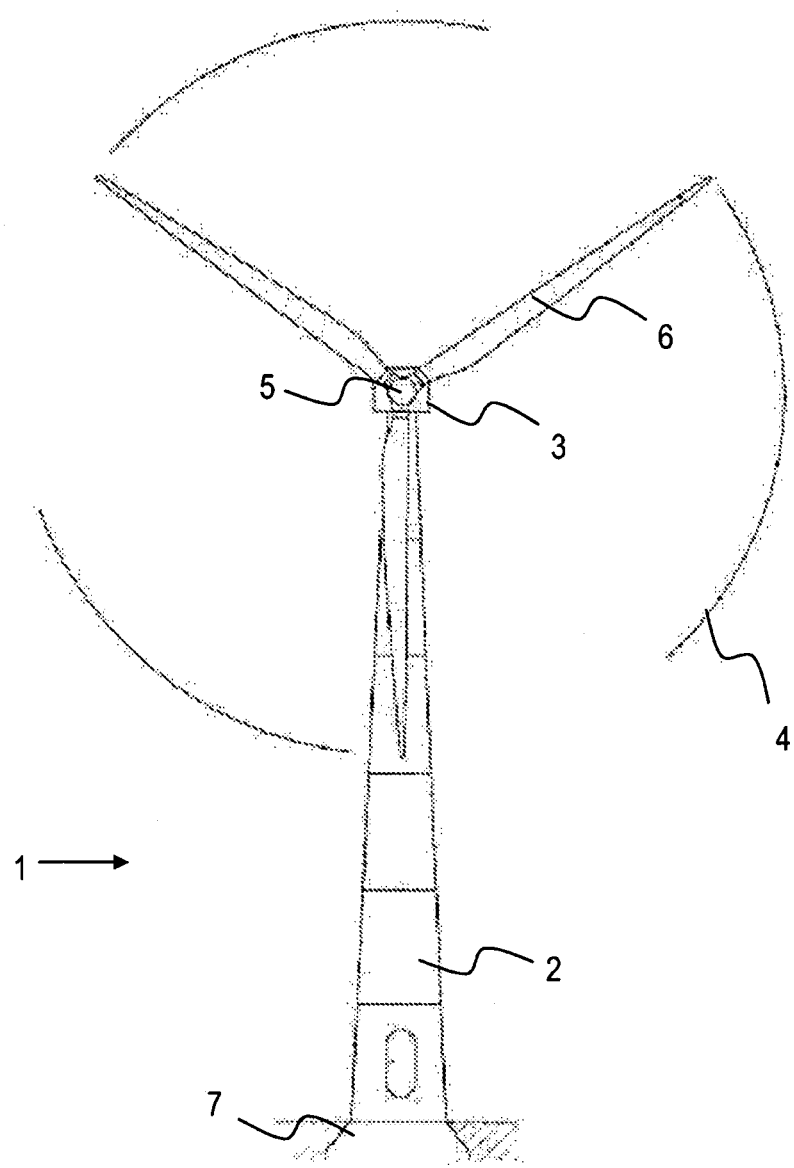
FIG. 1 shows a general structure of a wind turbine.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Some transmission grids may require a rapid decrease in output of active power from Wind Power Plants (WPP), often such rapid decrease is called a "fast run-back". This may be triggered by over-frequency excursions or other grid events.

This required power ramp down rate at the turbine output may be based on requirements from grid codes. It may also be defined or specified by a user or operator. For example, a grid code may require that a WPP be able to ramp down its power at 0.4 pu/sec. The desired turbine power may be an instantaneous turbine power output of the desired power profile of the turbine.

Electrical power, known to the person skilled in the art, can be divided into an active power component and a reactive power component. For run-back there will be a need to reduce the active power component.

The present invention provides a novel solution to reduce active power output from a wind power plant without causing mechanical loads on the wind turbine generators. This allows for a fast run back when fast reduction in power is needed.

The invention comprises a power plant controller and a method of operation it, which decreases the voltage level inside the wind power plant during fast run-back events.

The voltage should be decreased to the minimum level, without violating the connection agreement or tripping any wind turbine generators.

The lower voltage level of the wind power plant will have two benefits:

The losses in the cables and other substation equipment will increase. This will very quickly decrease the output of the WPP without adding any mechanical stress to the wind turbine generators.

Secondly, if the fast run-back is triggered by an over-frequency situation, pulling down the voltage on the grid will benefit the whole system.

Present wind power plant controllers often dispatch a power reference to each wind turbine. With this present invention the power plant controller can either lower the voltage level at each wind turbine generator by lowering the reactive power reference or dispatching a separate Voltage reference point.

A run-back event may start when the power plant controller detects a negative Power error ($P_{required}-P_{delivered}$) or a surplus of power and the power plant controller then initiates a run-back event, which starts by dispatching a voltage reference or a reactive power ($Q_{ref}$) reference, which is lower than the present value of either Voltage or Q to each wind turbine generator within the wind power plant. There are several triggering parameters other than power imbalance to initiate a run-back event; this could be high frequency, a high rate-of-change of frequency, or a dedicated run-back signal from the Transmission System Operator and etc.

The $Q_{ref}$ of $V_{ref}$ can be calculated in many different ways. A feed-back loop which decreased the voltage (or Q) as long as the Power error is negative is one option. From knowledge on the construction on the wind power plant and thus the impedance, a look-up table could be created to provide the right increase in reactive power (Q) or voltage level for each individual WTG to meet the exact power change. This could also be calculated in real time if the wind power plant cable data is input into some computer code. There could also be a type of learning algorithm that determines the best references based on past observations.

In a preferred embodiment a Q reference is used as the parameter, as this is believed to be faster in response time.

In an embodiment the dispatched $Q_{ref}$ may be different from turbine to turbine. The $Q_{ref}$ for each turbine may be calculated based on measured impedances for each turbine, or based on feedback, or alternatively based on a learning algorithm when the Power plant controller measures/learns the impedance level of each turbine based on a small signal response or data capturing during normal operation.

In an embodiment the dispatched $V_{ref}$ may different from turbine to turbine. The $V_{ref}$ for each turbine may be calculated based on measured impedances for each turbine, or based on feedback, or alternatively based on a learning algorithm when the Power plant controller learns impedance level of each turbine based on a small signal response or data capturing during normal operation. Different $V_{ref}$ to each wind turbine generator should take into consideration the fact that the voltage level along a power line/cable drops due to the impedance of the line/cable.

An embodiment of the present invention is taking the impedance into account which gives a better effect of the active power losses, but it also ensures that the voltage level at each wind turbine generator does not get below a minimum level, which will cause the turbine to trip.

As an example, the wind power plant may feed electrical energy into a 110 kV power supply grid. Thus, the voltage at a point of common coupling (PCC), Vpcc, equals 110 kV. The wind power plant voltage, Vpp, may for example be in the order of around 30 kV. Thus, a power transformer is needed in order to match Vpp with Vpcc. However, it should be noted that since Vpcc is fixed and since a power transformer has a non negligible intrinsic impedance that varies with the amount of power injected into the power supply grid, the power plant voltage, Vpp, needs to be varied with the amount of power injected into the power supply grid. Thus, power plant voltage, Vpp, will be shifted upwards and downwards depending on the amount of power injected into the power supply grid.

FIG. 1 shows a general setup of a wind turbine generator 1. The wind turbine generator 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The electrical energy is subsequently converted into a fixed frequency electrical power by a power converter to be supplied to a power grid. The wind turbine generator may also form part of a wind farm or a wind power plant comprising a plurality of wind turbines. All the electrical power generated by the individual wind turbines generators in the wind farm are consolidated and supplied to the power grid via a Point of Common Coupling (PCC).

Although the wind turbine 1 shown in FIG. 1 has three blades 6, it should be noted that a wind turbine may have different number of blades. It is common to find wind turbines having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 6 in the rotor 4.

Figure 2:
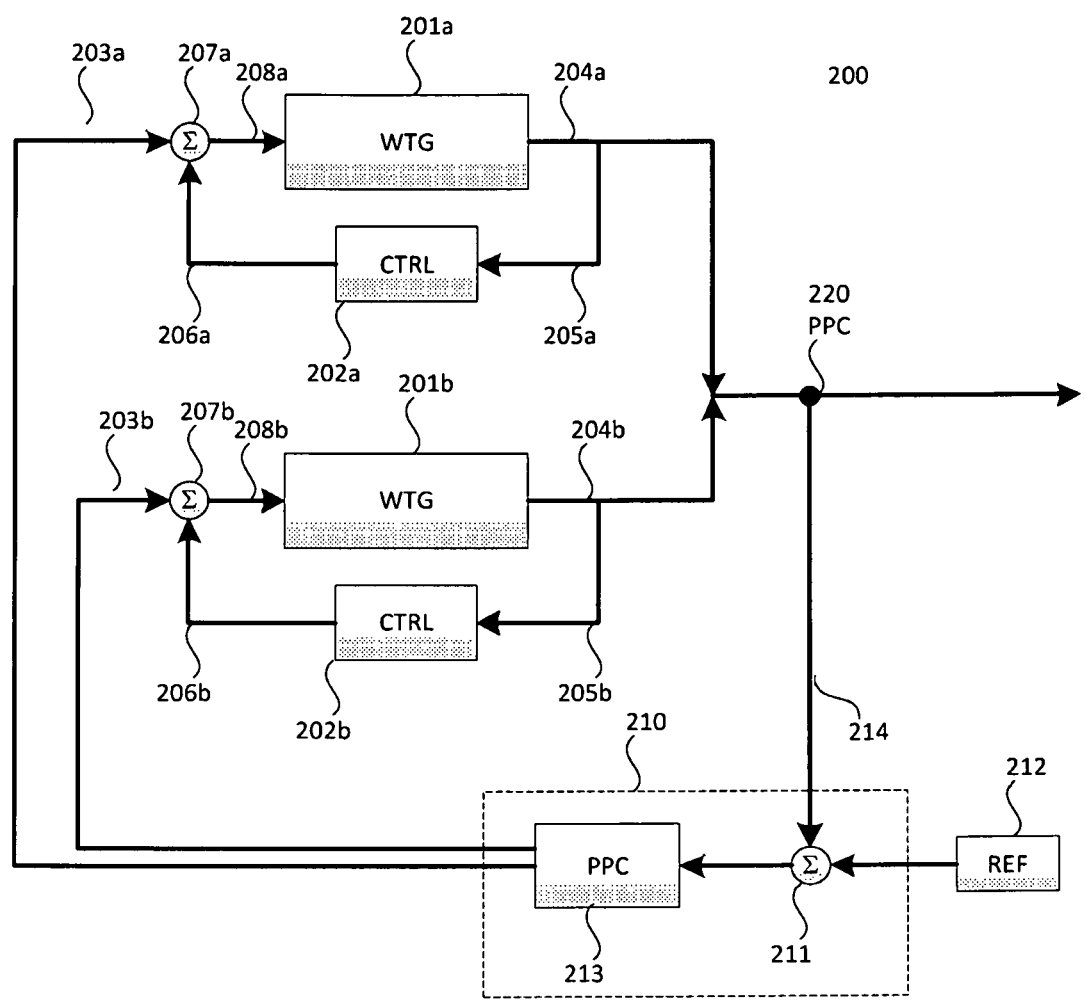
FIG. 2 shows a wind power plant according to the present invention.

FIG. 2 shows a wind power plant 200, with two wind turbine generators 201a, 201b. The number two is just for simplicity; the wind power plant 200 could include any appropriate number higher than two. The wind turbine generator 201a has an output signal 204a, in this example it is the voltage, (but it could also be understood as an output vector with information about voltage, frequency, reactive and active power). The output signal 204a, 204b, respectively, is measured 205a, 205b, respectively, by voltage sensor (not shown) and fed into a voltage controller 202a, 202b, respectively, of the wind turbine generator. The controller 202a, 202b, respectively, generates a voltage set point 206a, 206b, respectively, which is compared with a voltage reference $V_{ref}$ 203a, 203b, respectively, from the power plant controller 213 in a summation block 207a, 207b, respectively. The controller error 208a, 208b is used as controller parameter in the wind turbine generators 201a. The power plant controller 210 gets measurements 214 of the voltage at the point of common coupling (PCC) 220, obtained by a another voltage sensor (not shown). The measurement 214 is compared to a voltage reference 212 in summation block 211, this reference 212 may have been generated within the power plant controller (PPC) 210 or it may have been supplied externally. The output of the summation block 211 is feed into a PPC voltage controller 213, which dispatches individual voltage references 203a, 203b to the individual wind turbine generators 201.

Although FIG. 2 shows that the wind turbine generators 201a, 201b receives an $V_{ref}$ 203a, 203b, some embodiments may not have the $V_{ref}$ 203a, 203b signal, i.e. if there no signal from the PPC 210 to the turbine controller 202, 207, the voltage controller at the turbine level 202 controls the voltage level at its own electrical terminals 204.

The voltage references 203a, 203b may, in an embodiment, instead be a reactive power reference. Even if the reference signal is a reactive power reference, the output signal to be measured may be a voltage signal, in other embodiments it may be a reactive power signal.

As mentioned in relation to the output vectors 204a, 204b, similar observations are valid for the power plant dispatched reference 203a, 203b, in that these can also be vectors with information on voltage reference, frequency reference, reactive and active power reference. The dispatched signal may be only one value or a selection of the above mentioned references. When the reference is a vector with n values, the controller 202 should be understood as n controllers, each a feedback loop for its respective reference signal.

In that way it is fairly simple to dispatch an extra reference value in order to lower the voltage outputs 204a, 204b of the WTGs 201a, 201b.

Figure 3:
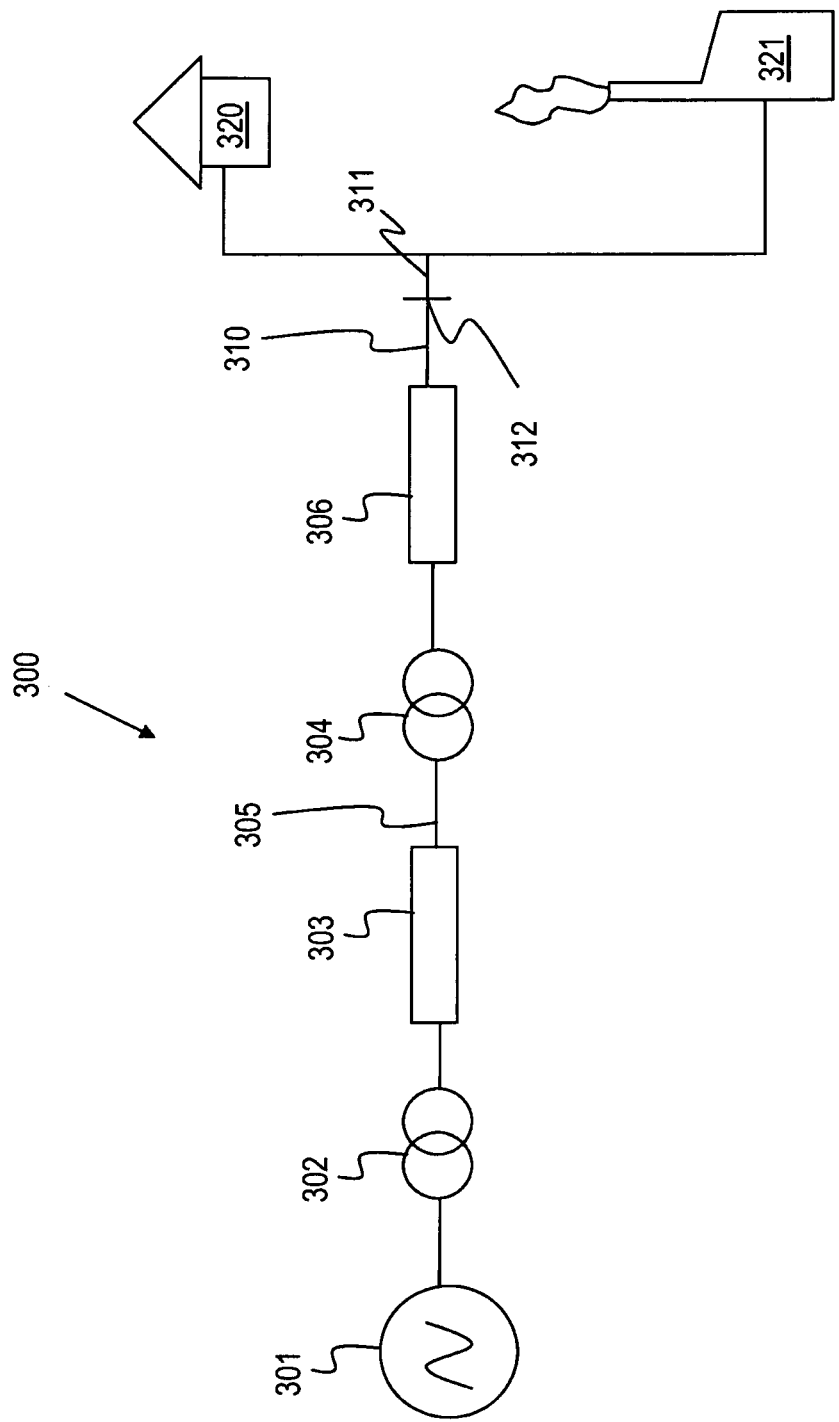
FIG. 3 shows the impedance sources of a wind power plant.

As illustrated in FIG. 3, and explained in more details later, the wind turbine generator experiencing the highest impedance to the point of common coupling needs to generate the highest wind turbine voltage level in order to compensate for voltage drops in the internal power grid.

However, by following this approach the highest wind turbine voltage level within the plant may become dangerously close to, or even exceed, an upper voltage level with the risk of damaging the internal grid. Moreover, a long time exposure to a voltage level being lower than the nominal voltage level could result in damages to the equipment. This is due to higher currents in order to keep the power level constant. The voltage profiles of wind turbines connected to the internal power grid depend on the impedance values and the apparent power flowing through the internal power grid. This also means that the WTGs furthest away from the point of common coupling run the highest risk of getting into a low voltage mode when applying the present invention.

FIG. 3 shows a schematic layout of the wind power plant 300 according to an embodiment. The schematic layout of FIG. 3 illustrates the impedances that are introduced into the wind power plant 300. For the sake of clarity, only one wind turbine generator 301 is illustrated in FIG. 3. It should be noted that the wind power plant 300 may include more than one wind turbines generator 301. Is it also assumed that both the reactive and active currents are generated by the wind turbine generator 301. The wind turbine generator 301 is connected to a wind turbine transformer 302. The wind turbine transformer 302 is in turn connected to the wind power plant transformer 304 via power cables 305. The impedance of the power cables 305 is represented by the cable impedance 303. The wind power plant 300 is connected to a utility system or grid 311 using overhead lines (OVL) 310. The impedance of the OVL 310 is represented by the OVL impedance 306. The wind power plant 300 interfaces with the grid 311 through the PCC 312. The grid 311 supplies power to a load, for example a household unit 320. Additional power plants, for example a conventional coal power plant 321, may also supply power to the grid 311. According to an embodiment, the cable impedance 303 and the OVL impedance 306 are taken into account when determining the active and reactive currents to be generated, so as to provide the optimal reactive current at the PCC 312.

The present invention can contribute to reduction of the total power from a wind power plant in the area of 0-10% of rated power.

An alternative to this present invention is to disconnect wind turbine generators or even fast tripping WTG's which may cause high mechanical loads on the WTG structure and drive train.

In an embodiment the wind turbine generators 201a, 201b (FIG. 2) have an enable signal (not shown) which enables the controllers 202a, 202b to take into account the run-back reference signal only when the enable signal has been detected. This enable signal may only be generated upon detection of a wind turbine generator shut down signal. When this enable signal is not detected by the controller 202a, 202b, respectively, of the wind turbine generator 201a, 201b, respectively, the run-back reference signal is ignored by the controllers 202a, 202b. This increases the robustness of the control algorithm carried out by the controllers 202a, 202b.

Figure 4:
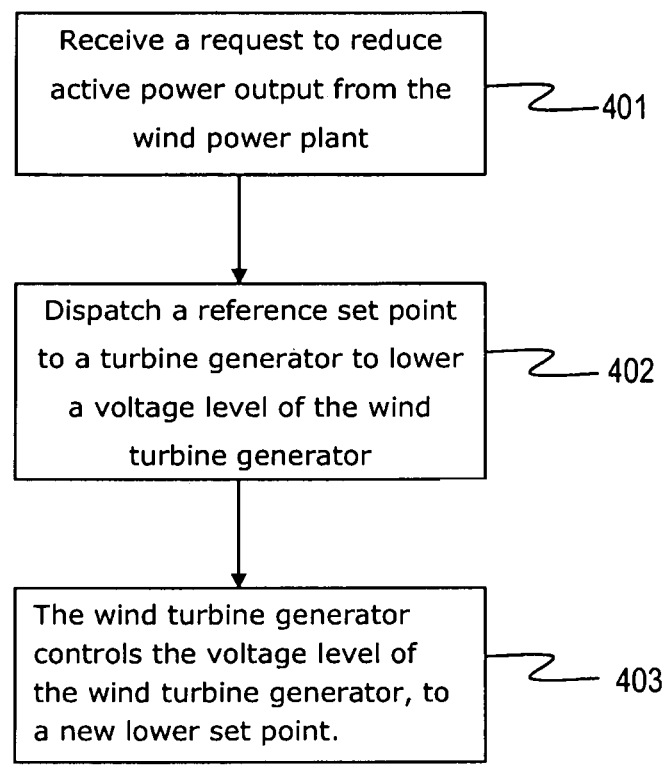
FIG. 4 shows a flow-chart of a method for providing fast run back according to an embodiment.

FIG. 4 shows a flow-chart of a method for controlling a wind power plant, with at least one wind turbine generator, and a power plant, controller, according to an embodiment. Step 401 includes a step where the power plant receives a request to reduce active power output from the wind power plant.

The subsequent step 402 includes the dispatching of a reference set point to a turbine generator to lower a voltage level of the wind turbine generator.

The subsequent and final step 403 includes the control loop of wind turbine controller to regulate the voltage level of the wind turbine generator, to a new lower set point.

In summary the invention relates to a method for operating a wind power plant, with at least one wind turbine generator and a power plant controller, the method includes the steps of receiving a request to reduce active power output from the wind power plant, dispatching a reference set point to the at least one wind turbine generator to lower a voltage level of the least one wind turbine generator, and the at least one wind turbine generator controls the voltage level of the least one wind turbine generator, to a new lower set point. The present invention also relates to a wind power plant where the method is implemented.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A method of operating a wind power plant comprising a plurality of wind turbine generators (WTGs) coupled with a power plant controller, the plurality of WTGs comprising at least one first WTG and at least one second WTG, the method comprising:
upon determining to reduce an active power output of the wind power plant at a plant ramp down rate that would cause the first WTG to exceed a maximum generator ramp down rate corresponding to the first WTG:
reducing a voltage level of the first WTG from an initial voltage level to a reduced voltage level; and
operating the second WTG at a different voltage level than the reduced voltage level of the first WTG,
wherein operation of the first WTG at the reduced voltage level causes an increase of active power losses within the wind power plant, whereby the active power output of the wind power plant is reduced at the plant ramp down rate without causing the first WTG to exceed the maximum generator ramp down rate.

2. The method of operating a wind power plant according to claim 1, wherein determining to reduce the active power output of the wind power plant is performed responsive to determining an occurrence of one or more predetermined conditions for initiating a runback event.

3. The method of claim 2, wherein the one or more predetermined conditions for initiating a runback event comprise at least one of: a power imbalance between the wind power plant and an electrical grid coupled with the wind power plant, exceeding a predetermined frequency value of the electrical grid, exceeding a predetermined frequency rate of change value of the electrical grid, and receiving a dedicated runback signal.

4. The method of operating a wind power plant according to claim 1, wherein reducing the voltage level of the first WTG comprises communicating a reactive power reference signal for the first WTG.

5. The method of operating a wind power plant according to claim 1, wherein reducing the voltage level of the first WTG comprises communicating a voltage reference signal for the first WTG.

6. The method of operating a wind power plant according to claim 1, wherein reducing the voltage level of the first WTG comprises communicating a reference signal for the first WTG, the method further comprising:
calculating the reference signal based on an impedance at a connection point of the first WTG.

7. The method of operating a wind power plant according to claim 6, further comprising:
calculating the impedance based on one or more electrical parameter values for components of the wind power plant.

8. The method of operating a wind power plant according to claim 6, further comprising:
measuring the impedance during operation of the wind power plant.

9. The method of claim 7, wherein the one or more electrical parameter values comprises one or more of:
an impedance of power cables connecting a wind turbine transformer and a wind power plant transformer, and
an impedance of overhead lines connecting the wind power plant transformer to the utility grid.

10. The method of claim 1, wherein the reduced voltage level comprises a minimum voltage level at which the at first WTG will not trip.

11. The method of claim 1, wherein the reduced voltage level comprises a minimum voltage level at which the first WTG will not violate a predetermined connection agreement with a transmission system operator.

12. The method of claim 1, wherein reducing the voltage level of the first WIG comprises communicating a reference signal for the first WTG, wherein the power plant controller comprises a feedback loop configured to generate the reference signal upon detecting a negative power error.

13. A power plant controller for controlling a wind power plant comprising a plurality of wind turbine generators (WTGs), the plurality of WTGs comprising at least one first WTG and at least one second WTG, wherein the power plant controller is configured to:
upon determining to reduce an active power output of the wind power plant at a plant ramp down rate that would cause the first WTG to exceed a maximum generator ramp down rate corresponding to the first WTG:
reduce a voltage level of the first WTG from an initial voltage level to a reduced voltage level, and
operate the second WTG at a different voltage level than the reduced voltage level of the first WTG,
wherein operation of the first WTG at the decreased voltage level causes an increase of active power losses in the wind power plant, whereby the active power output from the wind power plant is reduced at the plant ramp down rate without causing the first WTG to exceed the maximum generator ramp down rate.

14. The power plant controller according to claim 13, wherein determining to reduce the active power output of the wind power plant is performed response to determining an occurrence of one or more predetermined conditions for initiating a runback event.

15. The power plant controller according to claim 13, wherein reducing the voltage level of the first WTG comprises communicating a reactive power reference signal for the first WTG.

16. The power plant controller according to claim 13, wherein reducing the voltage level of the first WTG comprises communicating a voltage reference signal for the first WTG.

17. The power plant controller according to claim 13, wherein reducing the voltage level of the first WTG comprises communicating a reference signal for the first WTG, wherein the reference signal is calculated based on an impedance at a connection point of the first WTG.

18. The power plant controller according to claim 17, wherein the impedance is calculated based on one or more electrical parameter values for components of the wind power plant.

19. The power plant controller according to claim 17, wherein the impedance is measured during operation of the wind power plant.

20. A computer program product comprising a non-transitory computer-readable storage medium containing code which, when executed by one or more processors, performs an operation for operating a wind power plant comprising a plurality of wind turbine generators (WTGs), the plurality of WTGs comprising at least one first WTG and at least one second WTG, the operation comprising:
upon determining to reduce an active power output of the wind power plant at a plant ramp down rate that would cause the first WTG to exceed a maximum generator ramp down rate corresponding to the first WTG:
reducing a voltage level of the first WTG from an initial voltage level to a reduced voltage level; and
operating the second WTG at a different voltage level than the reduced voltage level of the first WTG,
wherein operation of the first WTG at the reduced voltage level causes an increase of active power losses within the wind power plant, whereby the active power output of the wind power plant is reduced at the plant ramp down rate without causing the first WTG to exceed the maximum generator ramp down rate.

21. The computer program product of claim 20, wherein determining to reduce the active power output of the wind power plant is performed responsive to determining an occurrence of one or more predetermined conditions for initiating a runback event.

* * * * *